US 9,518,657 B2

(12) United States Patent
Kristofcsak (10) Patent No.: US 9,518,657 B2
(45) Date of Patent: Dec. 13, 2016

(54) PARKING LOCK ARRANGEMENT AND MOTOR VEHICLE TRANSMISSION

(71) Applicant: GETRAG Getriebe- und Zahnradfabrik Hermann Hagenmeyer GmbH & Cie KG, Untergruppenbach (DE)

(72) Inventor: Andras Kristofcsak, Leverkusen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 14/636,358

(22) Filed: Mar. 3, 2015

(65) Prior Publication Data

US 2015/0252897 A1    Sep. 10, 2015

(30) Foreign Application Priority Data

Mar. 4, 2014    (DE) .................. 10 2014 102 831

(51) Int. Cl.
*F16H 63/34*    (2006.01)
*F16H 63/18*    (2006.01)
*F16H 61/12*    (2010.01)

(52) U.S. Cl.
CPC .......... *F16H 63/3491* (2013.01); *F16H 63/18* (2013.01); *F16H 63/3408* (2013.01);
(Continued)

(58) Field of Classification Search
CPC .............. F16H 63/3491; F16H 63/3425; F16H 63/3483
See application file for complete search history.

(56) References Cited

U.S. PATENT DOCUMENTS

| 6,752,036 B2 | 6/2004 | Kropp | |
| 7,861,839 B2* | 1/2011 | Schweiher | .......... F16H 63/3433 192/220.2 |
| 2010/0101353 A1* | 4/2010 | Giefer | ..................... F16H 61/22 74/473.18 |

FOREIGN PATENT DOCUMENTS

| DE | 10045953 | * | 5/2002 |
| DE | 10157460 A1 | | 6/2003 |

(Continued)

OTHER PUBLICATIONS

German Search Report for DE Patent Application No. 10 2014 102 831.7, mailed on Nov. 17, 2014, 6 pages.
European Search Report dated Jul. 28, 2015, 7 pages.

*Primary Examiner* — Mark Manley
(74) *Attorney, Agent, or Firm* — Reising Ethington P.C.

(57) ABSTRACT

A parking lock arrangement for a motor vehicle transmission has a housing. A parking lock wheel is connectable to a shaft of the motor vehicle transmission. A parking lock pawl is pivotable between a parking lock position and a release position about a pawl axis mounted on the housing. In the parking lock position, the parking lock pawl is in engagement with the parking lock wheel and prevents the rotation thereof. The parking lock arrangement comprises an actuating mechanism for the parking lock pawl and an actuator arrangement for the actuating mechanism. The actuator arrangement has a control member which is movable between a home position and a parking position and is coupled to the actuating mechanism. An actuating member is coupled to the control member via a releasable coupling device and to the actuating mechanism, wherein the actuating member is furthermore mechanically preloaded in one direction in order, via the actuating mechanism, to press the parking lock pawl into the parking lock position. The (Continued)

coupling device is designed in such a manner that it is releasable by means of an electric release signal.

21 Claims, 4 Drawing Sheets

(52) U.S. Cl.
CPC ..... *F16H 63/3416* (2013.01); *F16H 63/3425* (2013.01); *F16H 63/3458* (2013.01); *F16H 63/3483* (2013.01); *F16H 61/12* (2013.01)

(56) References Cited

FOREIGN PATENT DOCUMENTS

| | | |
|---|---|---|
| DE | 102009018122 | 10/2010 |
| EP | 1334297 | 8/2003 |
| EP | 1865237 | 12/2007 |
| FR | 2967226 A1 | 5/2012 |

\* cited by examiner

PARKING LOCK ARRANGEMENT AND MOTOR VEHICLE TRANSMISSION

CROSS-REFERENCES TO RELATED APPLICATIONS

This application claims the priority from German patent application DE 10 2014 102 831.7 filed on Mar. 4, 2014

BACKGROUND OF THE INVENTION

The present invention relates to a parking lock arrangement for a motor vehicle transmission, with a housing, with a parking lock wheel which is connectable to a shaft of the motor vehicle transmission, with a parking lock pawl which is pivotable between a parking lock position and a release position about a pawl axis mounted on the housing, wherein, in the parking lock position, the parking lock pawl is in engagement with the parking lock wheel and prevents the rotation thereof, with an actuating mechanism for the parking lock pawl, and with an actuator arrangement for the actuating mechanism, wherein the actuator arrangement has a control member, in particular a drum, which is movable, in particular rotatable, between a home position and a parking position and is coupled to the actuating mechanism. If the control member is designed as a drum, the drum has a cam portion which is assigned to the parking position, wherein the actuator arrangement then furthermore has a lever arrangement with a cam lever which is pivotable about a lever axis mounted on the housing and which has a cam follower portion, wherein the cam lever is then coupled to the actuator mechanism.

Furthermore, the present invention relates to a motor vehicle transmission with such a parking lock arrangement.

A parking lock arrangement is known from document EP 1 865 237 A1. In the case of this parking lock arrangement, the actuating mechanism and the actuator arrangement are formed by a single two-sided lever, one side of which acts on a cam portion of a selector drum via a spring and the other side of which forms the locking pawl. A further parking lock arrangement for a motor vehicle is known from document DE 10 2009 018 122 A1. This parking lock arrangement has an actuating mechanism in the form of a sliding cone which is actuable by means of a magnetic actuator.

SUMMARY OF THE INVENTION

It is the object of the present invention to specify an improved parking lock arrangement and an improved motor vehicle transmission, wherein reliable setting up of the parking lock position can be ensured.

The above object is achieved, according to a first aspect of the invention, by a parking lock arrangement for a motor vehicle transmission, with a housing, with a parking lock wheel which is connectable to a shaft of the motor vehicle transmission, with a parking lock pawl which is pivotable between a parking lock position and a release position about a pawl axis mounted on the housing, wherein, in the parking lock position, the parking lock pawl is in engagement with the parking lock wheel and prevents the rotation thereof, with an actuating mechanism for the parking lock pawl, and with an actuator arrangement for the actuating mechanism, wherein the actuator arrangement has a drum which is rotatable between a home position and a parking position, wherein the drum has a cam portion assigned to the parking position, wherein the actuator arrangement furthermore has a lever arrangement with a cam lever which is pivotable about a lever axis mounted on the housing, and which has a cam follower portion, wherein the cam lever is coupled to the actuating mechanism, wherein the lever arrangement has an actuating lever which is coupled to the cam lever via a releasable coupling device and is positively coupled to the actuating mechanism, wherein the actuating lever is furthermore mechanically preloaded in a pivoting direction in order, via the actuating mechanism, to press the parking lock pawl into the parking lock position, and wherein the coupling device is designed in such a manner that it is releasable by means of an electric release signal.

According to a second aspect of the present invention, the above object is achieved by a parking lock arrangement for a motor vehicle transmission, with a housing, with a parking lock wheel which is connectable to a shaft of the motor vehicle transmission, with a parking lock pawl which is pivotable between a parking lock position and a release position about a pawl axis mounted on the housing, wherein, in the parking lock position, the parking lock pawl is in engagement with the parking lock wheel and prevents the rotation thereof, with an actuating mechanism for the parking lock pawl, and with an actuator arrangement for the actuating mechanism, wherein the actuator arrangement has a control member which is movable between a home position and a parking position and is coupled to the actuating mechanism, wherein the actuator arrangement has an actuating member which is coupled to the control member via a releasable coupling device and is positively coupled to the actuating mechanism, wherein the actuating member is furthermore mechanically preloaded in order, via the actuating mechanism, to press the parking lock pawl into the parking lock position, and wherein the coupling device is designed in such a manner that it is releasable by means of an electric release signal.

Furthermore, the above object is achieved by a motor vehicle transmission with a parking lock arrangement according to the invention, wherein, in the case of the first aspect of the invention, the drum is preferably a selector drum for actuating at least one clutch arrangement of the motor vehicle transmission.

In the case of the first aspect of the invention, in order to correctly set up the parking lock position of the parking lock pawl, the drum is driven in such a manner that the cam portion thereof enters into engagement with the cam follower portion of the cam lever, as a result of which the cam lever is pivoted in a pivoting direction which is directed in such a manner that the parking lock pawl can be pressed via the actuating mechanism into the parking lock position. Normally, this takes place by the cam lever being coupled to the actuating lever via the coupling device and, consequently, pivoting of the cam lever causes the actuating mechanism to be acted upon with a force which is used to press the parking lock pawl into the parking lock position.

If there is a defect on the selector drum and/or the selector drum for other reasons cannot be rotated in such a manner that the cam portion enters into engagement with the cam follower portion of the cam lever, this state is detected by a master control device. The control device thereupon outputs an electric release signal to the coupling device. The coupling device is thereby released. By this means, the actuating lever is no longer coupled to the cam lever and, owing to the mechanical preloading, is pivoted in order thereby, via the actuating mechanism, to press the parking lock pawl into the parking lock position.

In other words, the parking lock arrangement can be actuated either by means of the selector drum or by outputting an electric release signal.

In the case of the second aspect of the present invention, in order to set up the parking lock position, the control member is driven in such a manner that it is movable into a parking position. By means of the coupling to the actuating mechanism, the parking lock pawl is pressed into the parking position. The control member can be a drum, but can also be a linearly movable control member or a pivotable control member or the like.

If the control member cannot be moved, this state is detected preferably by a master control device which then outputs the electric release signal to the coupling device. The coupling device is thereby released. By this means, the actuating member is no longer coupled to the control member. Owing to the positive coupling and the preloading of the actuating member, the latter is then moved in such a manner that the parking lock pawl is pressed into the parking lock position.

In the case of the first aspect of the invention, a cam lever is pivoted by means of a drum. In the case of the second aspect of the invention, the control member can also be pivoted by other means, for example by a hydraulic cylinder. In the case of the second aspect of the invention, the control member can also be formed by a member which is movable in a translational manner, instead of a pivotable lever. All of the references below to a cam lever and the actuation thereof by a drum can relate in the same manner to a control member which is movable in a translational or rotary manner and is moved or displaced by means of any means. In the same manner, the actuator arrangement, in the case of the second aspect of the invention, does not necessarily have to have an actuating lever. On the contrary, it is possible to provide an actuating member which is pivotable in the manner of a lever or else is movable in a translational manner or in another manner. All of the references below to an actuating lever are intended to relate in the same manner for the second aspect of the invention to such a generalized actuating member which is coupled to the control member via a releasable coupling device.

In other words, in the case of the second aspect of the invention, instead of a lever arrangement with a cam lever and an actuating lever, the actuator arrangement can also have any arrangement consisting of a control member and an actuating member that are coupled to each other via a releasable coupling device, wherein the control member and/or the actuating member are movable in a rotary manner, are movable in a translational manner or are movable in another manner. It is also possible, for example, for the control member to be moved in a rotary manner and the actuating member in a translational manner, or vice versa.

In some embodiments, the release signal can also be a hydraulic release signal, in which case the coupling device is designed in such a manner that it is releasable by means of a hydraulic release signal.

The coupling device can be released, for example, via a magnetic actuator which is activatable by the electric release signal in order to release the coupling device.

The actuating mechanism for the parking lock pawl can be realized in various ways. It can be a sliding cone arrangement in which a sliding cone is pressed between a housing portion and the parking lock pawl in order to pivot the latter into the parking lock position. The sliding cone can be mounted here on a coupling bar so as to be displaceable to a limited extent, wherein a latching spring is provided. In the event that the actuating mechanism actuates the parking lock pawl while a parking lock tooth of the parking lock pawl is in contact with a tooth of a toothing of the parking lock wheel (tooth on tooth contact), the latching spring is tensioned, with a relative offset taking place between the sliding cone and the bar bearing the sliding cone. As soon as the vehicle drives on from this position, the parking lock wheel is rotated, and therefore the parking lock pawl can engage with the tooth thereof in the next toothed gap, which takes place by means of the tensioned latching spring.

An actuating mechanism of this type is known in general in the prior art. Furthermore, the parking lock pawl is generally provided with a retaining device which can retain the parking lock pawl in the release position. The retaining device can be, for example, a retaining spring, but can also be formed by a suitable guide.

In general, the actuating mechanism can consequently be formed by a member movable in a translational manner, such as a bar on which a sliding cone is arranged. However, it is also possible for the actuating mechanism to have a cam mechanism which is rotated about an axis. In order to actuate the parking lock pawl, an actuating cam is frequently connected here to an actuating shaft of the actuating mechanism via a latching torsion spring. The same function can thereby be achieved in a "tooth on tooth contact" situation, as described above.

Actuating mechanisms of this type are also known in general.

The pawl axis is preferably oriented parallel to the shaft of the motor vehicle transmission, but can also be oriented transversely with respect thereto. The drum of the first aspect of the invention is preferably rotatable by means of an actuator drive, which can be, for example, an electric motor. However, the actuator drive for driving the drum can also be a hydraulic drive. An axis of rotation of the drum is preferably oriented parallel to an axis of the shaft of the motor vehicle transmission. By this means, an outer circumference of the drum can be provided with, for example, a contour which is configured to move a gear selector fork axially with respect to the shaft in order thereby to actuate, for example, a shift clutch arrangement.

A shift clutch arrangement of this type preferably includes at least one loose wheel which is mounted on a shaft and is connectable by means of the shift clutch arrangement to the shaft for rotation therewith, in order thereby, for example, to engage a gear stage in the motor vehicle transmission.

In the case of the second aspect of the invention, the control member can be moved in any manner by means of an actuator drive, wherein the actuator drive can be an electric motor, a hydraulic cylinder, a solenoid or the like.

The cam lever of the first aspect of the invention is preferably likewise mechanically preloaded, specifically in one direction, and therefore the cam follower portion is pressed on in the direction of a circumferential portion of the drum, on which the cam portion is also formed. The cam portion and the cam follower portion are coordinated with each other in such a manner that, in the event of engagement of same, the cam lever is pivoted in one direction in order, via the actuating lever and the actuating mechanism, to press the parking lock pawl into the parking lock position. In the case of the second aspect of the invention, the actuating member is mechanically preloaded.

The release signal for releasing the coupling device can preferably be generated by a comparison of a pivoting position of the actuating lever with a rotational position of the selector drum, to be precise in a control device which is preferably assigned to the motor vehicle transmission. In the case of the second aspect of the invention, the release signal can preferably be generated by a comparison of a position of the actuating member with a position of the control member and/or of an actuator drive for the control member, specifically in a control device.

The cam portion of the first aspect of the invention can be a portion which protrudes in relation to a circumferential portion of the drum, but can also be a depression set back in relation to the circumference of the selector drum.

When the coupling device has been released, and therefore the actuating lever has pressed the parking lock pawl via the actuating mechanism into the parking lock position, in the case of the first aspect of the invention renewed coupling of actuating lever and cam lever preferably subsequently takes place. For this purpose, whenever the drum is rotatable again, said drum is rotated into the parking position. By this means, the cam lever follows the pivoting travel of the actuating lever. The electric release signal can be switched off in this case. Renewed coupling of actuating lever and cam lever then preferably takes place, for example, because of a latching device or another mechanically preloaded device. In general, it is also conceivable to move the coupling device in an active manner again into the coupling state.

The selector drum can subsequently be rotated further again out of the parking position. In this case, because of the action of the cam lever, the actuating lever moves the actuating mechanism into a position in which the parking lock pawl is pivotable, or is inevitably pivoted, into the release position.

When, in the case of the second aspect of the invention, the coupling device has been released, and therefore the actuating member has pressed the parking lock pawl via the actuating mechanism into the parking lock position, renewed coupling of control member and actuating member preferably takes place by means of a latching device or another mechanically preloaded device, specifically preferably when an actuator drive for the control member moves back out of the home position into the parking position. As in the case of the first aspect of the invention, it is also conceivable to move the coupling device in an active manner again into the coupling state. The actuator drive can subsequently be moved again out of the parking position into the home position, wherein, owing to the coupling between actuating member and control member, the actuating member is then transferred again into the home position in which the parking lock pawl is movable into the release position.

Instead of a sensor for sensing the position of the actuating lever, it is also possible to sense the position of the actuating mechanism. It is also conceivable to sense the position of the parking lock pawl.

In order to ensure that the parking lock arrangement is not unintentionally released over prolonged periods, it is also conceivable always to release the coupling device when the selector drum or another actuator drive is in the parking position, in order thereby to obtain a redundancy with respect to the security of the engagement.

The object is therefore completely achieved.

It is particularly preferred if, in the case of the first aspect of the invention, the actuating lever is pivotable about the lever axis.

The actuating lever and the cam lever are thereby pivotable about the same lever axis, which structurally simplifies the realization of a coupling device.

According to a particularly preferred embodiment, the coupling device has a coupling pin which, in a coupling position, passes axially through openings in the cam lever and in the actuating lever or openings in the control member and the actuating member.

The levers or members can thereby be coupled fixedly to one another in a structurally simple manner.

It is preferred here if the coupling pin is preloaded into the coupling position.

This makes it possible, after the coupling device is released, for the coupling position to be automatically resumed when the two levers or members are brought again into a predetermined relative position to each other.

Overall, it is also preferred if the coupling pin is mounted on the actuating member or actuating lever in an axially displaceable manner.

The coupling pin is thereby fixedly assigned to the actuating lever or to the actuating member.

It goes without saying that the cam lever or the control member is formed in a planar manner in a region which corresponds to a relative offset of the coupling pin with respect to the cam lever or the control member when the coupling device is released, specifically preferably in a planar manner with an orientation perpendicularly to an axis of movement of the coupling pin.

Accordingly, the coupling pin, when the latter is moved back counter to the preloading thereof, in order to release the cam lever or the control member, can slide with its end side over said surface if, when the coupling device is released, the actuating lever or the actuating member is pivoted or moved in some other way relative to the cam lever or the control member.

According to a further preferred embodiment, the coupling pin is movable axially by means of a magnetic actuator in order to release the coupling device.

The movement takes place in particular counter to a preloading of the coupling pin, with which the coupling pin is preloaded into the coupling position.

A magnetic actuator of this type can be activated in a simple manner by means of an electric release signal which is generated, for example, by a control device.

It is particularly preferred here if the magnetic actuator is fixed on the cam lever or on the control member, specifically preferably in such a manner that a movable armature of the magnetic actuator is oriented coaxially with the coupling pin if the coupling device is in the coupling position.

Overall, it is likewise advantageous if the actuating lever or the actuating member is assigned a position sensor which senses the position of the actuating lever or of the actuating member.

It is possible by this means to sense whether, for example, in the event of a signal for moving the drum or the actuator drive into the parking position, a movement of the actuating lever or of the actuating member into that position in which said actuating lever or said actuating member presses the parking lock pawl via the actuating mechanism into the parking lock position, has actually taken place.

The position sensor can be mounted, for example, on the housing and can sense the presence of a magnet fixed on the actuating lever or on the actuating member.

According to a further, overall preferred embodiment, the rotational position of the drum can be sensed by means of a rotational position sensor or a position of the control member by means of a position sensor.

Such a position sensor can likewise be designed as a magnetic sensor or as an incremental sensor. However, such a position sensor can also be derived from signals of the electric motor if such an electric motor drives the drum or the control member.

Furthermore, it is advantageous if, in the case of the first aspect of the invention, the cam lever and the actuating lever are pressed on each other axially by means of a spring arrangement.

It can thereby be ensured that they are permanently in contact and that, for a coupling pin which passes through openings in the levers, a sufficient overlap can be provided in the axial direction when the coupling device is in the coupling position.

In an embodiment of the drum as a selector drum for actuating at least one shift clutch arrangement, the selector drum can be moved on the way into the parking position into a shift position in which a gear stage is engaged. In some cases, the engagement of such a gear stage may be blocked or else such a gear stage may be disengaged. In this case, the selector drum may not be able to be rotated further despite a corresponding activation signal. This would be, for example, a starting point for the generation of the electric release signal. Furthermore, such an electric release signal can also be generated whenever the actuation of the drum has an error state in another manner.

It goes without saying that the features which are mentioned above and those which have yet to be explained below can be used not only in the respectively stated combination, but also in different combinations or on their own without departing from the scope of the present invention.

BRIEF DESCRIPTION OF THE DRAWINGS

Exemplary embodiments of the invention are represented in the drawings and are explained in more detail in the following description. In the drawings.

DESCRIPTION OF PREFERRED EMBODIMENTS

Figure 1:
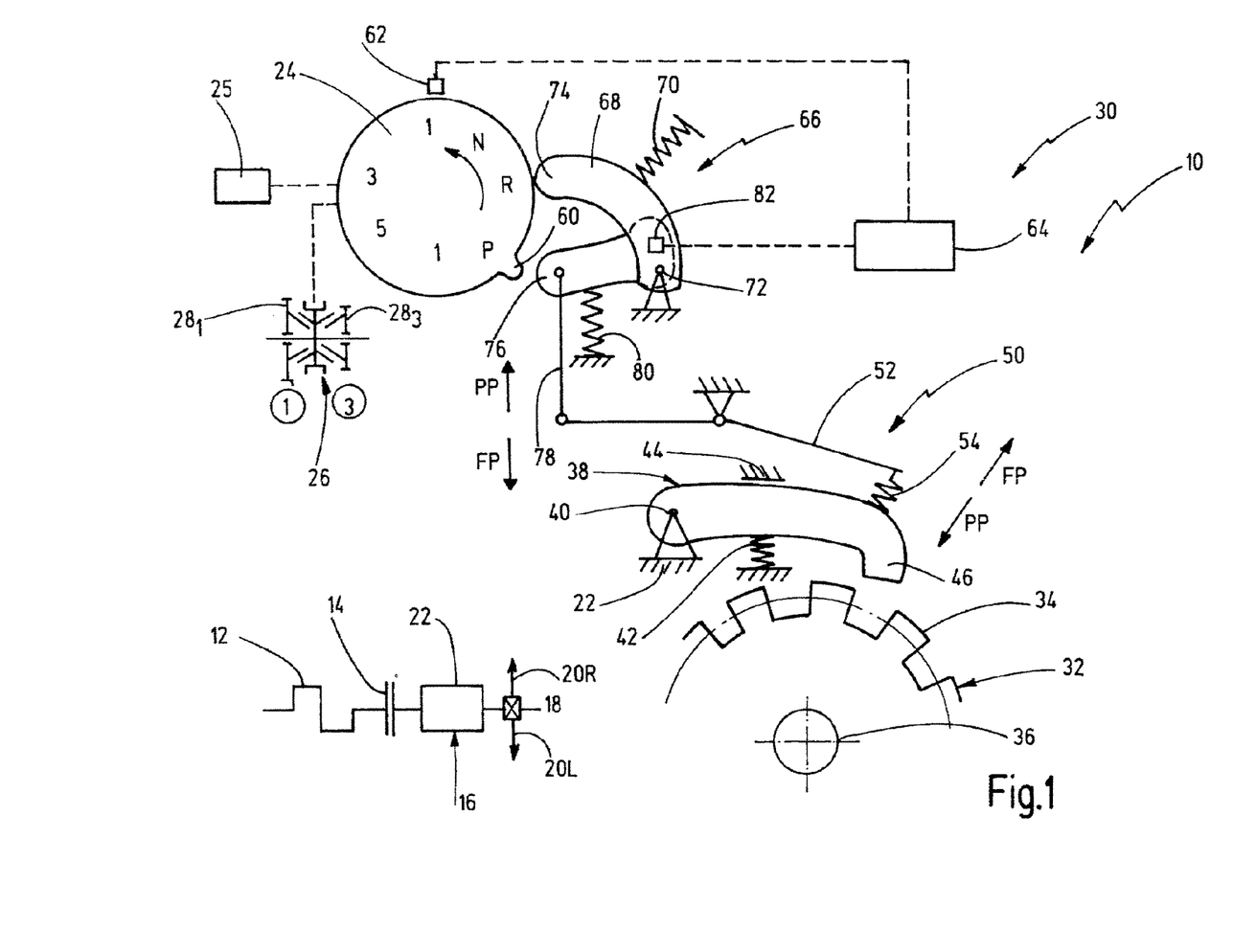
FIG. 1 shows a schematic illustration of a drive train of a motor vehicle with a schematic illustration of a parking lock arrangement according to the invention, wherein a parking lock pawl is in a release position.

A drive train for a motor vehicle is illustrated in schematic form in FIG. 1 and is denoted in general by 10. The drive train 10 has a drive motor 12 which can be formed, for example, by an internal combustion engine or by a hybrid drive unit. A drive shaft of the drive motor 12 is connected to a clutch arrangement 14 which can be designed as a single clutch or as a dual clutch. The clutch arrangement 14 is connected on the output side to a transmission 16 which can be designed, for example, as a range transmission, in particular in a lay shaft construction. However, the clutch arrangement 14 and the transmission 16 can also be formed by an automatic converter. An output of the transmission 16 is connected to a differential 18 by means of which motive power is distributed between the driven wheels 20L, 20R. A housing of the transmission 16 is shown at 22.

The transmission 16 has a selector drum 24 which is driven by means of a selector drum motor 25 which can be, for example, an electric motor. The selector drum 24 serves in a manner known per se for actuating at least one shift clutch arrangement 26. The shift clutch arrangement 26 shown in FIG. 1 serves for the alternative connection of a shaft (not denoted specifically) of the transmission 16 to loose wheels $28_1$ and $28_3$ which can serve, for example, for the engagement of gear stages 1 and 3.

The transmission 16 furthermore has a parking lock arrangement 30. The parking lock arrangement 30 includes a parking lock wheel 32 which, on the outer circumference thereof, has a parking lock toothing 34 and is fixed on a transmission shaft 36. The transmission shaft 36 is preferably an output shaft of the transmission 16 or a shaft of the differential 18.

The parking lock arrangement 30 furthermore includes a parking lock pawl 38 which is mounted pivotably in relation to the housing 22 about a pawl axis 40. The pawl axis 40 is preferably oriented parallel to the transmission shaft 36. The parking lock pawl 38 is retained by means of a retaining device 42 in a release position FP in which the parking lock pawl 38 releases the parking lock wheel 32, and therefore the latter can freely rotate. The retaining device 42 can be formed, for example, by a spring which presses the parking lock pawl 38 away from the parking lock wheel 32, for example towards a stop 44.

The parking lock pawl 38 has a pawl tooth 46 which, when a parking lock position PP is set up, can engage in a tooth gap of the parking lock toothing 34.

The parking lock pawl 38 is actuable by means of an actuating mechanism 50. In transmissions of the prior art, an actuating mechanism 50 of this type can be actuated manually via a selector lever in the interior of the motor vehicle.

An actuating mechanism 50 of this type can be formed in different ways, for example by a translational actuating mechanism, by a rotary actuating mechanism or, as illustrated in FIG. 1, via a two-sided lever 52. The one lever arm of the two-sided lever 52 is coupled to the parking lock pawl 38. Use is generally made here of a locking body which retains the parking lock pawl 38 in the parking lock position PP in an interlocking manner, optionally via a latching spring 54. For clear illustration reasons, only one latching spring 54 is illustrated in FIG. 1. In general, the lever arm can also be formed by the parking lock pawl.

In the present case, the actuating mechanism 50 is actuated by means of an actuator arrangement 58. The latter acts on the other lever arm of the two-sided lever 52. The actuator arrangement 58 includes a cam portion 60 on the selector drum 24.

The selector drum 24 can be assigned a rotational position sensor 62 which directly or indirectly senses the rotational position of the selector drum 24 and transmits same to a control device 64.

The actuator arrangement 58 furthermore includes a lever arrangement 66 which has a cam lever 68. The cam lever 68 is mounted pivotably about a lever axis 72 mounted on the housing and is pressed against a circumferential portion of the selector drum 24 by means of a cam lever spring 70. The cam lever 68 has a cam follower portion 74 which, whenever in engagement with the cam portion 60, deflects or pivots the cam lever 68, specifically counter to the force of the cam lever spring 70.

The lever arrangement 66 furthermore includes an actuating lever 76 which is likewise mounted pivotably about the lever axis 72. The actuating lever 76 is coupled to the actuating mechanism 50 via a coupling mechanism 78, wherein a positive coupling is preferably involved here. The actuating lever 76 is preloaded by means of an actuating lever spring 80, which is preferably likewise supported on a housing portion, in a direction in which the actuating lever 76 exerts such a force on the actuating mechanism 50 that the latter presses the parking lock pawl 38 from the release position FP into the parking lock position PP, as indicated schematically by arrows in FIG. 1.

The actuating lever 76 is coupled to the cam lever 68, in particular is coupled thereto for pivoting therewith, by means of a coupling device 82. A pivoting of the cam lever 68 on account of the engagement of the cam follower portion 74 with the cam portion 60 consequently inevitably leads to the actuating lever 76 pivoting at the same time, and therefore the latter presses the parking lock pawl into the parking lock position PP via the actuating mechanism 50.

Figure 2:
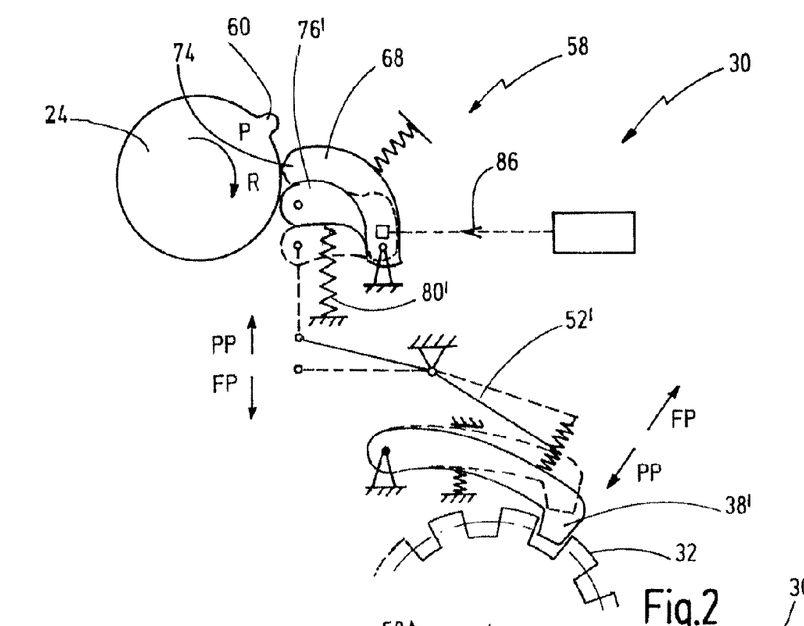
FIG. 2 shows the parking lock arrangement of FIG. 1 with the parking lock pawl in a parking lock position.
Figure 3:
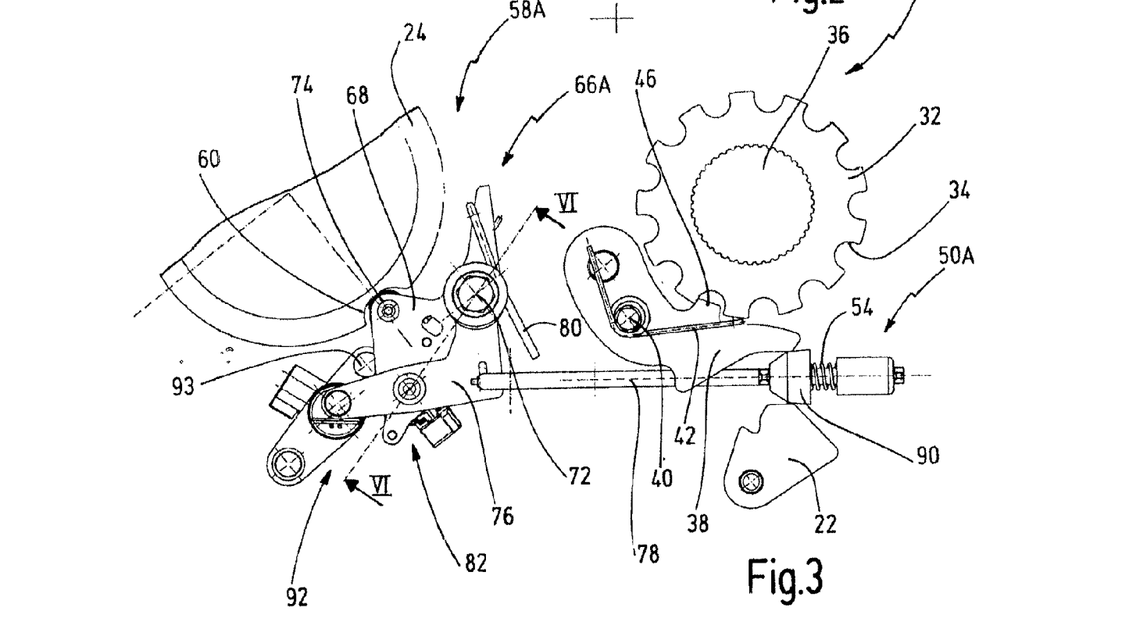
FIG. 3 shows an axial top view of a further embodiment of a parking lock arrangement according to the invention.
Figure 4:
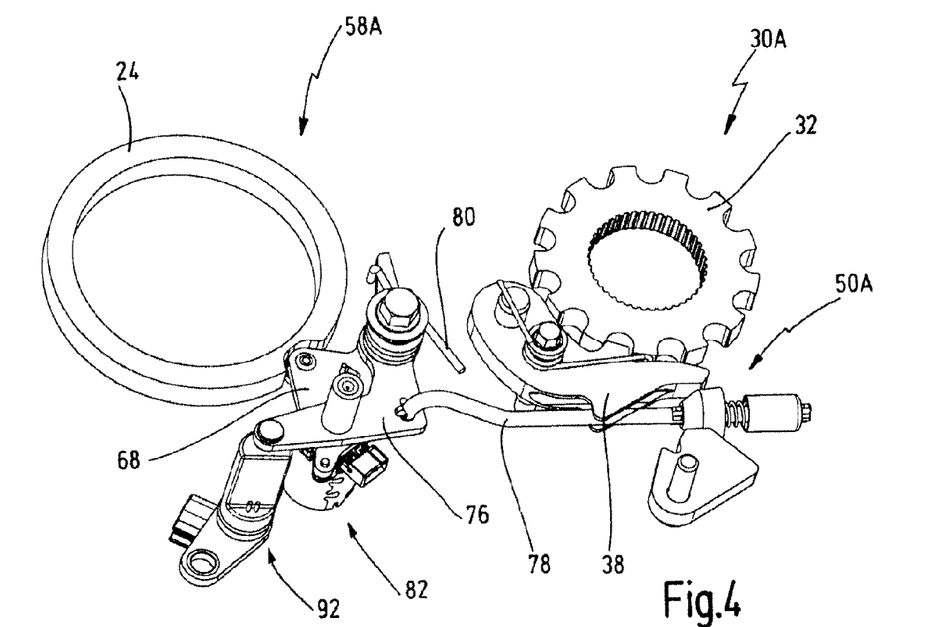
FIG. 4 shows a perspective view of the parking lock arrangement of FIG. 3 obliquely from above.
Figure 5:
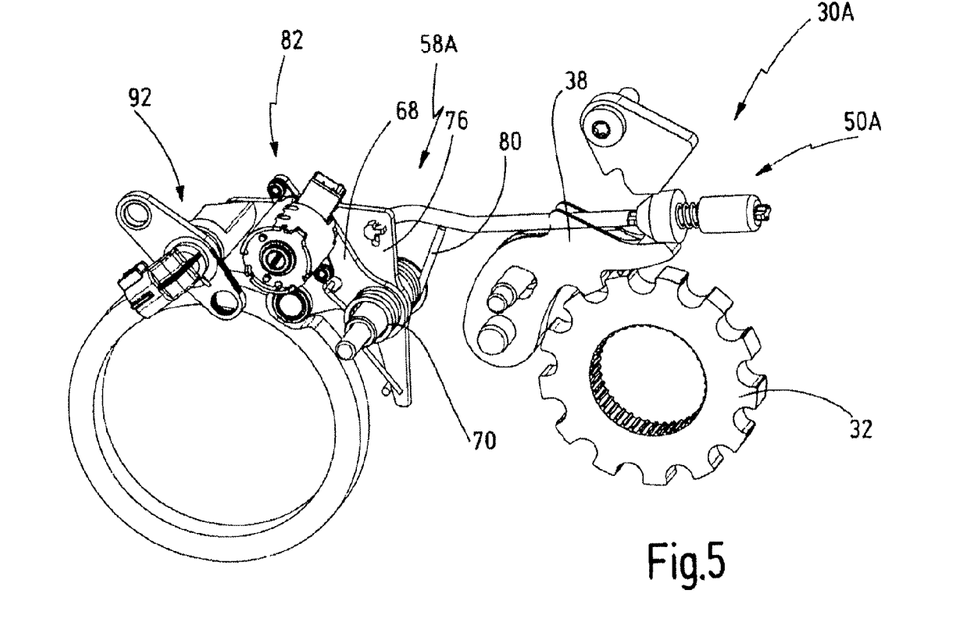
FIG. 5 shows a perspective view of the parking lock arrangement of FIG. 3 obliquely from below.

The coupling device 82 is designed in such a manner that it is releasable by means of a release signal 86 generated by the control device 64. This is illustrated in FIG. 2. By means of the release of the coupling device, the actuating lever 76 can pivot freely relative to the cam lever 68. Owing to the mechanical preloading by the actuating lever spring 80, the actuating lever 76' is pivoted in the direction of the parking lock position PP. By this means, the parking lock pawl 38 can be pressed into the parking lock position PP, as is shown in FIG. 2 at 38', without the cam lever 68 engaging by means of the cam follower portion 74 thereof on the cam portion 60 of the selector drum 24.

The release signal 86 can be generated, for example, if the rotational position sensor 62 senses that, despite a request to set up the actuation of the parking lock, the parking position P of the selector drum, in which the cam follower portion 74 engages on the cam portion 60, is not set up. It is illustrated in FIG. 2 that the cam follower portion 74 is on the contrary in a circumferential position which can correspond, for example, to a gear position, here the gear position R of the reverse gear. Owing to a gear hanger (engagement of the reverse gear stage is not possible or disengagement of the reverse gear stage is not possible), the selector drum 24 cannot be rotated further. In this case, the coupling device 82 can be released via the release signal 86, and therefore the parking lock position of the parking lock pawl 38 can nevertheless be reliably engaged.

The above description of a parking lock arrangement is substantially based on the first aspect of the present invention. In the case of an embodiment of a parking lock arrangement according to the second aspect of the present invention, an actuating member can be formed, for example, by a pivotable lever 76, or else by an element which is movable in a translational or other manner, such as a bar or the like, for example by the bar of a coupling mechanism 78.

In the case of the second aspect of the invention, a control member can be provided in the same manner instead of a cam lever, said control member being movable in a translational or rotary manner and being coupled to the actuating member via a coupling device. Instead of a selector drum, an actuator drive in the form of an electric motor, in the form of a hydraulic cylinder or the like can also be provided.

FIGS. 3 to 6 illustrate a further embodiment of a parking lock arrangement which is denoted in said figures by 30A and which corresponds in general with regard to construction and operation to the parking lock arrangement 30 of FIGS. 1 and 2. The same elements are therefore indicated by the same reference numbers. Essentially the differences are explained below.

In the present case, the actuating mechanism 50A of the parking lock arrangement 30A includes a sliding key arrangement with a sliding key 90 which is mounted on a coupling mechanism 78 in the form of a bar in a manner displaceable to a limited extent. The sliding key 90 is preloaded via a latching spring 54. When the bar 78 is moved in the key direction, the sliding key 90 is pressed between a portion of the housing 22 and a contact surface of the parking lock pawl 38 in order to press the latter into the parking lock position, as illustrated in the figures.

The bar 78 is fixed in an articulated manner on the actuating lever 76.

It can furthermore be seen that the actuating lever 76 is assigned a lever position sensor 92. For this purpose, a magnet 93 is fixed on the actuating lever 76, wherein the lever position sensor 92 is mounted on the housing and senses the position of the magnet 93, for example, in accordance with the Hall operative principle.

Figure 6:
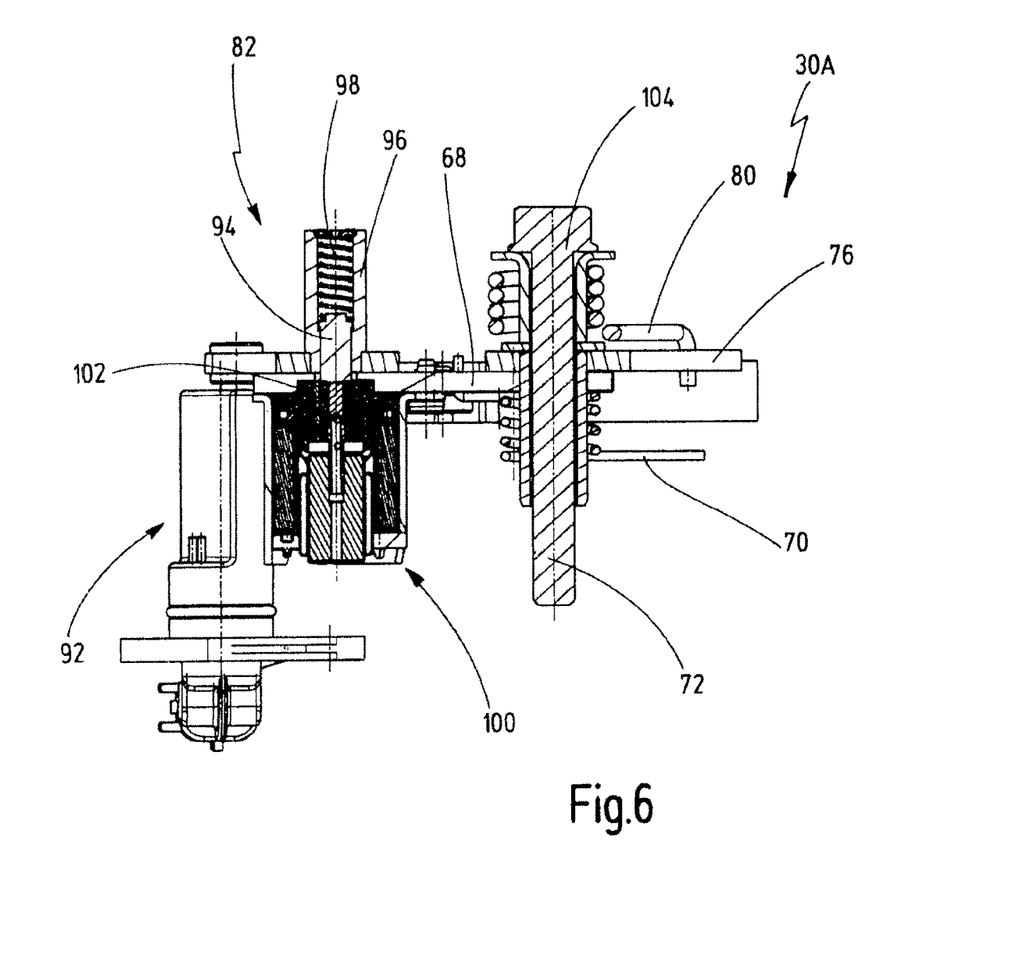
FIG. 6 shows a sectional view along the line VI-VI of FIG. 3.

The coupling device 82 is illustrated in detail in FIG. 6. The coupling device 82 comprises a coupling pin 94 which, in the position illustrated, passes axially through openings (not designated specifically) in the actuating lever 76 and in the cam lever 68. The coupling pin 94 is mounted in a pin housing 96 which is fixedly connected to the actuating lever 76. A pin spring 98 is arranged in the pin housing 96, said pin spring pressing the coupling pin 94 out of the opening in the actuating lever 76 into an opening in the cam lever 68 in order to couple the two levers to each other for pivoting therewith.

The coupling device 82 furthermore comprises a lifting magnet 100 which is fixed on the cam lever 68 on the axially opposite side. In the coupling position of the coupling device 82, an armature element 102 of the lifting magnet 100 is oriented coaxially with the coupling pin 94. When a release signal 86 is received, the lifting magnet 100 presses the armature element 102 in the direction of the coupling pin 94, and therefore said coupling pin 94 is pressed into the pin housing 96 counter to the force of the pin spring 98, with the coupling between the actuating lever 76 and the cam lever 68 being released. Upon renewed coupling of cam lever 68 and actuating lever 76, the coupling pin 94 enters again into alignment with the opening in the cam lever 68 and, owing to the pin spring 98, presses the armature element 102 back into a starting position in order to couple the two levers to each other.

FIG. 6 furthermore shows that the levers 76, 68 are mounted pivotably with respect to a lever axis 72. The lever axis 72 is formed by a screw or a bolt 104 which passes axially through the two levers. The actuating lever spring 80 is arranged on that side of the actuating lever 76 which is opposite the cam lever 68, said actuating lever spring 80 mechanically preloading the actuating lever 76 in the pivoting direction in order, via the actuating mechanism, to press the parking lock pawl 38 into the parking lock position PP. Furthermore, the spring 70 is arranged on that side of the cam lever 68 which faces away from the actuating lever 76. The springs 70, 80 are in each case arranged coaxially with respect to the screw 104. The screw 104 can furthermore serve in order to press the two levers against each other in the axial direction via the spring 80 and/or the spring 70. It can thereby be ensured that there is a sufficient overlap for the coupling pin when the coupling device is in the coupling position.

The invention claimed is:

1. A parking lock arrangement for a motor vehicle transmission, comprising:
   a housing;
   a parking lock wheel which is connectable to a shaft of the motor vehicle transmission;

a parking lock pawl which is pivotable between a parking lock position and a release position about a pawl axis mounted on the housing, wherein, in the parking lock position, the parking lock pawl is in engagement with the parking lock wheel and prevents the rotation thereof;

an actuating mechanism for the parking lock pawl; and an actuator arrangement for the actuating mechanism, wherein the actuator arrangement has a drum which is rotatable between a home position and a parking position, wherein the drum has a cam portion assigned to the parking position, wherein the actuator arrangement furthermore has a lever arrangement with a cam lever which is pivotable about a lever axis mounted on the housing, and which has a cam follower portion, wherein the cam lever is pivoted when the cam follower portion comes into engagement with the cam portion of the drum and the cam lever is coupled to the actuating mechanism, wherein the lever arrangement has an actuating lever which is coupled to the cam lever via a releasable coupling device and is positively coupled to the actuating mechanism, wherein the actuating lever is furthermore mechanically preloaded in a pivoting direction in order, via the actuating mechanism, to press the parking lock pawl into the parking lock position, and wherein the coupling device is designed in such a manner that it is releasable by means of an electric or a hydraulic release signal.

2. The parking lock arrangement according to claim 1, wherein the actuating lever is pivotable about the lever axis.

3. The parking lock arrangement according to claim 1, wherein the coupling device has a coupling pin which, in a coupling position, passes axially through openings in the cam lever and in the actuating lever.

4. The parking lock arrangement according to claim 3, wherein the coupling pin is preloaded into the coupling position.

5. The parking lock arrangement according to claim 3, wherein the coupling pin is mounted on the actuating lever in an axially displaceable manner.

6. The parking lock arrangement according to claim 3, wherein the coupling pin is movable axially by means of a magnetic actuator in order to release the coupling device.

7. The parking lock arrangement according to claim 6, wherein the magnetic actuator is fixed on the cam lever.

8. The parking lock arrangement according to claim 1, wherein the actuating lever is assigned a lever position sensor which senses the position of the actuating lever.

9. The parking lock arrangement according to claim 1, wherein the rotational position of the drum can be sensed by means of a rotational position sensor.

10. The parking lock arrangement according to claim 1, wherein the cam lever and the actuating lever are pressed axially on each other by means of a spring arrangement.

11. A parking lock arrangement for a motor vehicle transmission, comprising:
a housing;
a parking lock wheel which is connectable to a shaft of the motor vehicle transmission;
a parking lock pawl which is pivotable between a parking lock position and a release position about a pawl axis mounted on the housing, wherein, in the parking lock position, the parking lock pawl is in engagement with the parking lock wheel and prevents the rotation thereof;

an actuating mechanism for the parking lock pawl, the actuating mechanism having a bar on which a sliding key for engagement with the parking lock pawl is mounted; and an actuator arrangement for the actuating mechanism, wherein the actuator arrangement has a control member which is movable between a home position and a parking position and is coupled to the actuating mechanism, wherein the actuator arrangement has an actuating lever which is coupled to the control member via a releasable coupling device and is positively coupled in an articulated manner to the bar of the actuating mechanism, wherein the actuating lever is furthermore mechanically preloaded in order, via the actuating mechanism, to press the parking lock pawl into the parking lock position, and wherein the coupling device is designed in such a manner that it is releasable by means of an electric or a hydraulic release signal.

12. The parking lock arrangement according to claim 11, wherein the coupling device has a coupling pin which, in a coupling position, passes axially through openings in the control member and in the actuating lever.

13. The parking lock arrangement according to claim 12, wherein the coupling pin is preloaded into the coupling position.

14. The parking lock arrangement according to claim 12, wherein the coupling pin is mounted on the actuating lever in an axially displaceable manner.

15. The parking lock arrangement according to claim 12, wherein the coupling pin is movable axially by means of a magnetic actuator in order to release the coupling device.

16. The parking lock arrangement according to claim 15, wherein the magnetic actuator is fixed on the control member.

17. The parking lock arrangement according to claim 11, wherein the actuating lever is assigned a position sensor which senses the position of the actuating lever.

18. The parking lock arrangement according to claim 11, wherein a position of the control member can be sensed by means of a position sensor.

19. A parking lock arrangement for a motor vehicle transmission, comprising:
a housing;
a parking lock wheel which is connectable to a shaft of the motor vehicle transmission;
a parking lock pawl which is pivotable between a parking lock position and a release position about a pawl axis mounted on the housing, wherein, in the parking lock position, the parking lock pawl is in engagement with the parking lock wheel and prevents the rotation thereof;

an actuating mechanism for the parking lock pawl; and an actuator arrangement for the actuating mechanism, wherein the actuator arrangement has a drum which is rotatable between a home position and a parking position, wherein the drum has a cam portion assigned to the parking position, wherein the actuator arrangement furthermore has a lever arrangement with a cam lever which is pivotable about a lever axis mounted on the housing, and which has a cam follower portion, wherein the cam lever is coupled to the actuating mechanism, wherein the lever arrangement has an actuating lever which is coupled to the cam lever via a releasable coupling device and is positively coupled to the actuating mechanism, wherein the actuating lever is furthermore mechanically preloaded in a pivoting direction in order, via the actuating mechanism, to press the parking lock pawl into the parking lock position, and wherein the coupling device is designed in such a manner that it is releasable by means of an electric or a hydraulic release signal, and wherein the actuating lever is pivotable about the same lever axis as the cam lever.

20. A parking lock arrangement for a motor vehicle transmission, comprising:

a housing;

a parking lock wheel which is connectable to a shaft of the motor vehicle transmission;

a parking lock pawl which is pivotable between a parking lock position and a release position about a pawl axis mounted on the housing, wherein, in the parking lock position, the parking lock pawl is in engagement with the parking lock wheel and prevents the rotation thereof;

an actuating mechanism for the parking lock pawl; and an actuator arrangement for the actuating mechanism, wherein the actuator arrangement has a drum which is rotatable between a home position and a parking position, wherein the drum has a cam portion assigned to the parking position, wherein the actuator arrangement furthermore has a lever arrangement with a cam lever which is pivotable about a lever axis mounted on the housing, and which has a cam follower portion, wherein the cam lever is coupled to the actuating mechanism, wherein the lever arrangement has an actuating lever which is coupled to the cam lever via a releasable coupling device and is positively coupled to the actuating mechanism, wherein the actuating lever is furthermore mechanically preloaded in a pivoting direction in order, via the actuating mechanism, to press the parking lock pawl into the parking lock position, and wherein the coupling device is designed in such a manner that it is releasable by means of an electric or a hydraulic release signal, wherein the cam lever and the actuating lever are pressed axially on each other by means of a spring arrangement.

21. A parking lock arrangement for a motor vehicle transmission, comprising:

a housing;

a parking lock wheel which is connectable to a shaft of the motor vehicle transmission;

a parking lock pawl which is pivotable between a parking lock position and a release position about a pawl axis mounted on the housing, wherein, in the parking lock position, the parking lock pawl is in engagement with the parking lock wheel and prevents the rotation thereof;

an actuating mechanism for the parking lock pawl; and an actuator arrangement for the actuating mechanism, wherein the actuator arrangement has a control member which is movable between a home position and a parking position and is coupled to the actuating mechanism, wherein the actuator arrangement has an actuating member which is coupled to the control member via a releasable coupling device and is positively coupled to the actuating mechanism, wherein the actuating member is furthermore mechanically preloaded in order, via the actuating mechanism, to press the parking lock pawl into the parking lock position, and wherein the coupling device is designed in such a manner that it is releasable by means of an electric or a hydraulic release signal, wherein the coupling device has a coupling pin which, in a coupling position, passes axially through openings in the control member and in the actuating member, and wherein the coupling pin is mounted on the actuating member in an axially displaceable manner.

* * * * *